US006918009B1

(12) United States Patent
Sato et al.

(10) Patent No.: US 6,918,009 B1
(45) Date of Patent: Jul. 12, 2005

(54) CACHE DEVICE AND CONTROL METHOD FOR CONTROLLING CACHE MEMORIES IN A MULTIPROCESSOR SYSTEM

(75) Inventors: Mitsuru Sato, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/786,049
(22) PCT Filed: Dec. 18, 1998
(86) PCT No.: PCT/JP98/05759
§ 371 (c)(1), (2), (4) Date: Jun. 18, 2001
(87) PCT Pub. No.: WO00/38077
PCT Pub. Date: Jun. 29, 2000

(51) Int. Cl.[7] .............................................. G06F 12/00
(52) U.S. Cl. ...................... 711/137; 711/141; 711/144; 711/213
(58) Field of Search ................................ 711/137, 141, 711/144, 213

(56) References Cited

U.S. PATENT DOCUMENTS

| | | | | |
|---|---|---|---|---|
| 5,752,037 A | * | 5/1998 | Gornish et al. | 717/160 |
| 5,966,737 A | * | 10/1999 | Steely et al. | 711/213 |
| 6,128,703 A | * | 10/2000 | Bourekas et al. | 711/138 |
| 6,374,330 B1 | * | 4/2002 | Arimilli et al. | 711/141 |
| 6,378,048 B1 | * | 4/2002 | Prudvi et al. | 711/144 |
| 6,526,480 B1 | * | 2/2003 | Naruse et al. | 711/144 |

FOREIGN PATENT DOCUMENTS

| | | | | |
|---|---|---|---|---|
| JP | 7-282023 | 10/1995 | | |
| JP | 9-146835 | 6/1997 | | |
| JP | 10-154117 | 6/1998 | | |
| JP | 02000035918 A | * | 7/1998 | ........... G06F/12/08 |

OTHER PUBLICATIONS

James R. Goodman. "Cache Consistency and Sequential Consistency." Technical Report No. 61, Mar. 1989. pp. 1–4.

Joe Kazutaka, et al. "Parallel Processing Symposium." JSPP, May 1997. pp. 149–163.

* cited by examiner

Primary Examiner—Matthew Anderson
Assistant Examiner—Hetul Patel
(74) Attorney, Agent, or Firm—Staas & Halsey LLP

(57) ABSTRACT

In the case that at the time of generation of a pre-fetch request following a read request from one of the processors the data stored in other cache devices cannot be read unless its state tag is changed, a cache controller carries out weak read operation for causing failure in the pre-fetch request as a fetch protocol. Alternatively, the cache controller reads pre-fetch data without changing state tags of other cache devices, sets a weak read state (W), and stores the data. The data in the weak read state (W) is invalided by synchronization operation of memory consistency by software. Furthermore, the pre-fetch data is stored in a passive preservation mode in the present cache device. Even if the pre-fetch data corresponds to a read request from some other cache device, the preservation of the data is not informed to the other cache device.

16 Claims, 12 Drawing Sheets

READ

WRITE

| TAG | | STATE |
|---|---|---|
| b1 | b2 | |
| 0 | 0 | MODIFIED M |
| 0 | 1 | EXCLUSIVE E |
| 1 | 0 | SHARED S |
| 1 | 1 | INVALID I |

F I G. 11
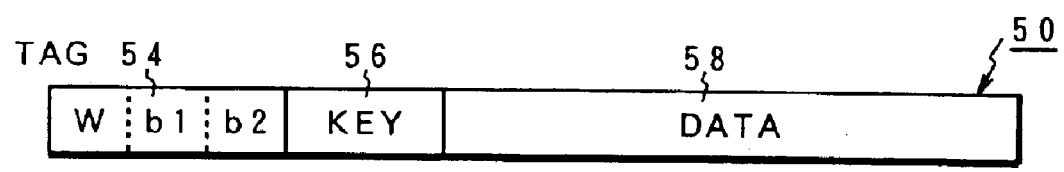

| REQUEST | REPLY |
|---|---|
| NORMAL + PREFETCH | NORMAL + PREFETCH |
| | ONLY NORMAL |
| NORMAL | ONLY NORMAL |
| PREFETCH | ONLY PREFETCH |
| | (NONE) |

CACHE DEVICE AND CONTROL METHOD
FOR CONTROLLING CACHE MEMORIES
IN A MULTIPROCESSOR SYSTEM

TECHNICAL FIELD

The present invention relates to a cache device and a cache control method for controlling cache memories in a multiprocessor system, and in particular to a cache device and a cache control method for controlling data pre-fetched in cache memories appropriately.

BACKGROUND ART

A cache device is one effective means for shortening memory access time in a computer. A small-capacity and high-speed memory called a cache memory is added to a processors and data accessed once is stored in the memory. Thus, when the data is next accessed, the data can be given back at a high speed.

FIG. 1 illustrates a cache mechanism of a multiprocessor system. Processors 102-1, 102-2, to 102-$n$ have cache devices 100-1, 100-2, to 100-$n$, respectively, and these cache devices are interconnected to a main memory 108 through an interconnecting network 106. In order that the cache device can work effectively, it is desirable to store data required by the processor in the cache as much as possible. In other words, if the data required by the processor is frequently not present in the cache, then the low-speed main memory must be accessed many times. Thus, the average memory access times is lowered. Particularly in a multiprocessor system, plural processors access the same memory; therefore, access-confliction is caused so that the average of the access speeds to the main memory is further lowered. For this reason, it is a very important theme in computer systems using the cache device to store the data required by the processor in the cache device.

In current cache devices, time locality and spatial locality of memory access are used to improve the ratio of hits on the cache devices. Time locality is the concept that data accessed once is likely to be accessed again soon, and is used in a manner, such as LRU, in which data accessed once is made not to be easily forced out, in the cache devices. Spatial locality is the concept that data near the data accessed once are likely to be accessed. This concept is used, in the cache devices, as shown by a cache line 111 of a cache memory 110 in FIG. 2. Namely, the concept is used in a such manner of storing, in a cache array 114 following an address 112, four block data including three block data (that is, block data 116-2 to 116-4 following an accessed block data 116-1); and managing concerned data in unit cache blocks. The spatial locality, which is different from the time locality, uses a method of taking, in advance, even data that is not actually required by the processor in the cache device. If this method is further developed, it becomes possible to use a method of storing, in advance, blocks that will be shortly required by the processor in the cache. This method is called pre-fetch. By using the pre-fetch, the ratio of hits on the cache device is further improved so that the access time to the memory can be shortened. This pre-fetch Is an effective manner not only for a single processor system but also for a multiprocessor system. In the multiprocessor system, however, a new problem of useless sharing arises.

In the cache system in a multiprocessor system, cache coherence is managed such that inconsistency between a cache device in one processor and a cache device in another processor is not caused. For example, as shown in FIG. 3A, data stored in a plurality of cache devices 100-1 to 100-$n$ are shared. In the case that the processor 100-$n$ performs writing on the shared data, the writing is performed after the processor 100-$n$ informs the other cache devices 100-1 and 102 having the same data that the writing will be performed to make the present data in the cache devices invalid without fail, as shown in FIG. 3B. By the invalidation, the other cache devices can know that the data that they have are not newest. The method that all processors can read the newest data at the time of the reading in this manner is cache coherency management. In the pre-fetch, one cache device predicts data that will be requested before long and reads the data as well as data required by the processor. However, this prediction does not necessarily prove to be right. Thus, useless data may be read. Even in the case of a single processor system, useless reading by the pre-fetch causes a problem, such as useless traffic between the main memory and a cache. In the case of a multiprocessor system, not only the useless traffic but also useless sharing arises. In other words, data that is not shared in the methods of reading only required data may be shared by plural caches in the methods of using the pre-fetch. It is necessary that at the time of writing onto the shared data in the cache device, the cache device informs the other cache devices that the writing will be performed. As far as this processing of informing the other cache devices is not finished, any data cannot be renewed. Therefore, the writing on the shared data is heavy processing, that is, processing which requires much time in the cache device. As a result, in the pre-fetch in any multiprocessor system, the drawbacks of the useless traffic and the useless sharing cancel the advantage of the pre-fetch. Thus, the multiprocessor system does not exhibit superior performance. As described above, in conventional cache devices, pre-fetch, which improves the ratio of hits on the caches, also results in an increase in overhead at the time of writing due to useless sharing and an increase in data-transmission by the pre-fetch. As a result, a problem that the pre-fetch is not easily applied to multiprocessor systems arises.

SUMMARY OF THE INVENTION

An object of the present invention is to provide a cache memory device and a cache memory device control method which effectively uses pre-fetch in cache devices of a multiprocessor system to improve a cache hit ratio without an increase in overhead or an increase in data-transmission.
[First Weak Read]

The present invention is a cache device set up in each of processors, interconnected to other cache devices in other processors and connected to a main memory. The device comprises a cache memory and a cache controller. In the cache memory, a part of data in the main memory is stored in one or more cache lines and a state tag using to manage data consistency is set up in each of the cache lines. The cache controller carries out, in the case that at the time of generation of a pre-fetch request following a read request from one of the processors data stored (i.e., preserved) in the other cache devices cannot be read unless its state tag is changed, weak read operation (first weak read) for causing failure in the pre-fetch request as a fetch protocol. In conventional cache devices, data must be read without fail if a read request is generated. Therefore, heavy processing for managing consistency, that is, the processing of changing the states of other caches and subsequently reading the data is necessary. However, the cache device of the present invention is provided with a pre-fetch protocol. Since pre-fetch is a speculative memory access, which may not be used afterwards, it is unnecessary to cause the reading based thereon to succeed surely. For this reason, the above-mentioned pre-fetch protocol is made to a protocol that when the states of the other cache devices are changed, the reading is caused to result in failure. Thus, weak reading operation, which may end in failure, is realized. This pre-fetch protocol causes exclusion of any pre-fetch resulting in the change in the states of the other cache devices, so as to reduce overhead accompanying the pre-fetch read request and writing on the data corresponding thereto.

The cache memory distinguishes the stored data by four states, that is, a data-modified state (M), an exclusive state (E), a data-shared state (S), and an invalid state (I), each of which indicates effectiveness of the state tag (an MESI protocol). The cache controller causes failure in the pre-fetch request on the basis of the present pre-fetch protocol when the data corresponding to the pre-fetch request and stored in the other cache devices generated following a read request from one of the processors is in the data-modified state (M) or the exclusive state (E). By using this pre-fetch protocol, it is possible to prevent the states of the cache devices in the exclusive state (E) or the data-modified state (M) from being changed and to reduce overhead accompanying the pre-fetch from the cache devices storing the data in the exclusive state (E) or the data-modified state (M).

The cache controller reads, when the data corresponding to the pre-fetch request and stored in the other cache devices is in the invalid state (I), the same data from the main memory and stores the same data in the exclusive state (E) in the cache memory; and when the data is in the data-shared state (S), the cache controller reads the data from the other cache devices and stores the data in the data-shared state (S) in the cache memory. The protocol in this case is based on the MESI protocol that is normal.

[Second Weak Read]

In the cache device of another embodiment of the present invention, a cache controller reads, in the case that at the time of generation of a pre-fetch request following a read request from one of the processors the data stored in the other cache devices cannot be read without changing its state tag, the data without changing the state tag to respond to the processor and stores the data in the cache memory with the setup of a weak state (W). Thereafter, the cache controller carries out, at the time of synchronization operation of memory consistency to attain data-consistency by software, a pre-fetch protocol that the data in the cache memory in the weak state (W) is wholly invalidated. The read operation for storing the pre-fetch data in this weak state is called a second weak read.

This second weak read uses the concept that in the memory consistency model accompanied by the synchronization operation for keeping weak consistency by software, the order of memory operations between the synchronization operations is arbitrary. In the case that this memory consistency model is used to perform reading of pre-fetch data which requires a change in the states of the other cache devices, the data the reading of which ends in failure by the first weak read is read by the second weak read so that the pre-fetch is normally ended. Afterwards, the present protocol reaches a synchronization point so that a synchronization message is delivered to the respective cache devices. As a result, the respective cache devices search data in the weak state (W) and invalidate all of the data. In this way, order-exchange over the synchronization point is prevented. Thus, the second weak read satisfies a requirement of a memory consistency model.

In the MESI protocol as an example, the cache controller reads, when data that corresponds to the pre-fetch request and that is stored in the other cache devices is in the data-modified state (M) or the exclusive state (E), the data without changing its state tag, sets up the weak state (W) and stores the data in the cache memory. At the time of synchronization operation of memory consistency, the weak state (W) is wholly changed to the invalid state (I).

Therefore, even if the data is pre-fetched in the weak state (W) and subsequently the processor renews the data that the other cache devices have in the exclusive state (E) or the data-modified state (M), the renewal is not conveyed to the cache device in the weak state (W). By this fact, however, it can be recognized that in the cache device in which the data is stored in the weak state (W) and the cache devices in which the data is stored in the data-modified state (M) or the exclusive state (E), the renewal order of the data is changed. This satisfies a memory consistency model. Afterwards, the present protocol reaches a synchronization point so that a synchronization message is delivered to the respective cache devices. As a result, the respective cache devices search data in the weak state (W) and invalidate all of the data. In this way, order-exchange over the synchronization point is prevented. Thus, the second weak read satisfies a requirement of a memory consistency model.

The cache controller reads, when the data corresponding to the pre-fetch request and stored in the other cache devices is in the invalid state (I), the same data from the main memory and stores the same data in the exclusive state (E) in the cache memory; and when the data is in the data-shared state (S), the cache controller reads the data from the other cache devices and stores the data in the data-shared state (S) in the cache memory. This case follows the MESI protocol.

[Passive Preservation Mode]

In the cache device of a further embodiment of the present invention, a cache controller set ups, at the time of generation of a pre-fetch request following a read request from one of the processors, a passive preservation mode P to data pre-fetched from the other cache devices or the main memory and then stores the data in the cache memory;

I. when the data corresponding to the read request from the other cache device is the pre-fetch data to which the passive preservation mode P is set up, the other cache device is not informed of the preservation of the corresponding data;

II. when none of the other cache devices store the corresponding data, the pre-fetch data is invalidated; and III. when the other cache devices share the corresponding data, the pre-fetch data is stored as it is.

The first and second weak read operations are operations in the case that, at the time of a pre-fetch request, a read request is made to other cache devices. Conversely, in a cache device in a multiprocessor system, the state of pre-fetch data stored in its cache memory may be changed by reading from some other cache device. Thus, the passive preservation mode (P) is set up, as a symbol indicating passive preservation for giving the other cache devices priority, to the pre-fetch data read from the main memory or the other cache devices, so that the data is not fetched even if a read request from some other cache device is recognized. Thus, the other cache device is prohibited from accessing the pre-fetch data. For this reason, about the pre-fetch data that would not be probably used actually but is stored by way of precaution, transition to a useless sharing state by state-change is reduced. Overhead at the time of writing read data on the cache device is reduced.

When the passive preservation mode and the weak reading overlap with each other, they can coexist by regarding data stored in the passive preservation mode as not exclusive (E). The cache device in which the data is stored in the passive preservation mode considers that this cache device does not have any data whether or not the cache device itself is exclusive (E), and then waits for information on the states of the other cache devices. Thus, transition to a useless sharing state can be avoided. In the cache device having, for example, the MESI protocol, the cache controller changes, when all of the other cache devices are invalid (I) or either one thereof is in the data-modified state (M) or the exclusive state (E) in the case that the data corresponding to a read request from some other cache device is pre-fetch data to which the passive preservation mode (P) is set up, the pre-fetch data stored in the passive preservation mode (P) into the invalid state (I) so that the data is not fetched. When the other cache devices are in the data-shared state(S), the pre-fetch data stored in the passive preservation mode (P) is kept as it is.

A normal preservation mode (N) is set up to data other than the pre-fetch data in the passive preservation mode (P) stored In the cache memory, and data-preservation in the passive preservation mode (P) and data-preservation in the normal preservation mode (N) are carried out in the respective cache lines, and caused to exist together.

It is difficult to apply the pre-fetch protocol of the present invention to normal data. Specifically, a normal data read request is generated when data becomes necessary in the processor. The fact that the reading of the data ends in failure and then the data is not obtained results in a drop in the operation performance of the processor. Therefore, the first weak read, the second weak read, and the passive preservation mode (P) of the present invention are applied only to reading of speculative data such as pre-fetch. In other words, normal data is stored in the normal preservation mode (N) in the cache device. Pre-fetch data, which is passive preservation data, is stored in the passive preservation mode (P). They are distinguished in the cache memory. In this manner, the cache device wherein preservation modes are set in the respective cache lines can be made.

When the cache controller receives a read request from the prospector, the cache controller performs a pre-fetch request of one or more addresses ADR+n adjacent to the read-requested address ADR following the read request. The pre-fetch request accompanying the read request form the processor is usually sent to the respective cache devices in separate command cycles. In the present invention, however, a pre-fetch request is embedded in a normal read request. When a read request of the address ADR is sent to the cache device, for example, in the case that pre-fetch of adjacent blocks is adopted, this request is also handled as a read request of an adjacent block ADR+1. The processor can therefore obtain the pre-fetch data without generating any read request of the address ADR+n for the pre-fetch.

Of course, any one of the first weak read, the second weak read, and the passive preservation mode (P), or any combination thereof is used to perform the pre-fetch request at this time. In other words, requests of different protocols to different addresses are put together into one request. Overhead by excessive requests is reduced by putting requests to the cache device together as described above.

The cache controller of the cache device carries out, when the cache controller receives the read request from the processor, a pre-fetch request of one or more addresses adjacent to a read-requested address after the read request. Specifically, as the interconnecting network for connecting the cache devices and the main memory, a snoop bus is used for outputting, the preservation states of the corresponding data into state controlling lines when the cache controller receives a read request from its own processor or some other cache device. These state controlling lines are a state controlling line that corresponds to and is exclusive for the read request and a state controlling line that corresponds to and is exclusive for a pre-fetch request, the read request and the pre-fetch request being carried out at the same time. The states of the respective cache devices about the address of the requested data and an address of the pre-fetch requested data are conveyed at the same time.

One of problems arising when pre-fetch is performed in a cache device in a multiprocessor is detection of states of other cache devices. In a normal read request, it is sufficient that the state detection of the cache device is performed only about a requested address. However, if pre-fetch is introduced, it is necessary that the state detection of the cache device is performed about a pre-fetched address as well as the requested address. Thus, a state signal line corresponding to a read request and a state signal line corresponding to a pre-fetch request are set up in a common bus so that results of the state-detection are simultaneously conveyed. Thus, overhead at the time of the request is reduced.

In the cache controller of the cache device, in reply to the simultaneous requests of the read request and the pre-fetch request using the exclusive state signal lines, a distinguishing bit for distinguishing data in response to the read request and data in response to the pre-fetch request is fitted up to a response header, and data making the distinguishing bit valid are transmitted in a lump. In this manner, overhead at the time of the reply is reduced.

The fact that the read request and the pre-fetch read request are simultaneously issued is used to put replies to the two requests together. At this time, for the pre-fetch read request the weak pre-fetch protocol is used; therefore, reading may result in failure. When the pre-fetch ends in failure, a data section in the reply is cut off and then the resultant is sent to the request source. By observing the validity of its distinguishing bit at this time, it can be understood whether the sent data is a reply to the read request, a reply to the pre-fetch request, or a reply to both. Effective data-transmission can be realized by putting replies to plural requests together into one reply and cutting off the section in which no data is present.

The present invention also provides a method for controlling a cache system wherein cache devices set up in respective processors are mutually connected through an interconnecting network and are connected to a main memory.

The control method for controlling the cache system, wherein the first weak read is performed, comprises the steps of:

I. storing a part of data in the main memory in one or more cache lines on cache memory and setting up a state tag using to manage data consistency in each of the cache lines, and II. carrying out, in the case that at the time of generation of a pre-fetch request following a read request from one of the processors the data stored in the other cache devices cannot be read unless its state tag is changed, weak read operation for causing failure in the pre-fetch request as a fetch protocol.

The control method for controlling the cache system, wherein the second weak read is performed, comprises the steps of:

I. storing a part of data in the memory in one or more cache lines on cache memory and setting up a state tag using to manage data consistency in each of the cache lines, II. reading, in the case that at the time of generation of a pre-fetch request following a read request from one of the processors the data stored in the other cache devices cannot be read without changing its state tag, the data without changing the state tag to respond to the processor, and subsequently storing the data, with the setup of a weak state (W), in the cache memory, and III. invalidating, at the time of synchronization operation of memory consistency to attain data-consistency by software, the data in the cache memory in the weak state (W) wholly.

The control method for controlling the cache system, wherein a passive preservation mode (P) is adopted, comprises the steps of:

I. storing a part of data in the main memory in one or more cache lines on cache memory and setting up a state tag using to manage data consistency in each of the cache lines, II. setting, at the time of generation of a pre-fetch request following a read request from one of the processors, the passive preservation mode (P) to data pre-fetched from the other cache devices or the main memory and storing the data in the cache memory, III. not informing, when data corresponding to the read request from the other cache device is the pre-fetch data to which the passive preservation mode P is set, the other cache device of preservation of the corresponding data, and IV. invalidating the pre-fetch data when none of the other cache devices store the corresponding data, and storing the pre-fetch data as it is when the corresponding data is shared by the other cache devices.

BRIEF DESCRIPTION OF THE DRAWINGS

FIG. 11 is an explanatory view of a tag bit having a weak state (W) used in second weak read;

DETAILED DESCRIPTION OF THE INVENTION

[System Structure]

Figure 1:
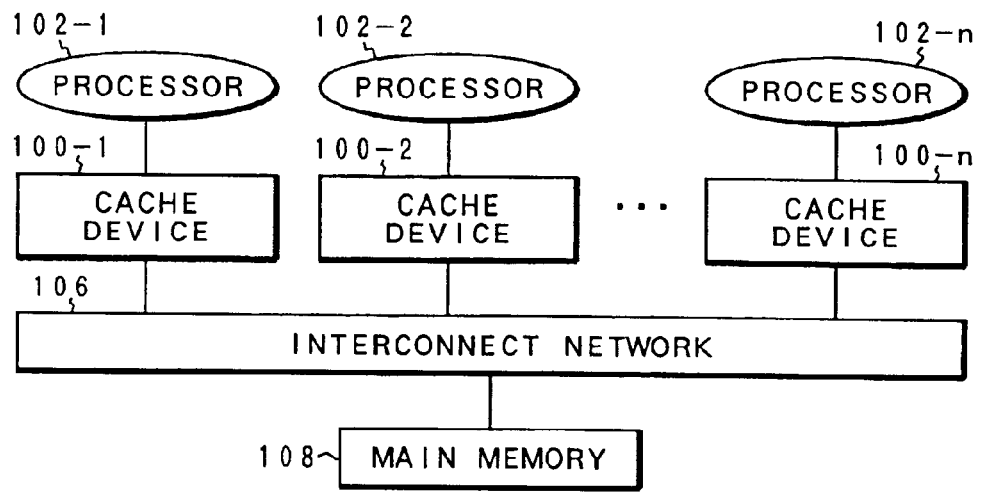
FIG. 1 is a block diagram of a conventional cache system relating to a multiprocessor system.
Figure 2:
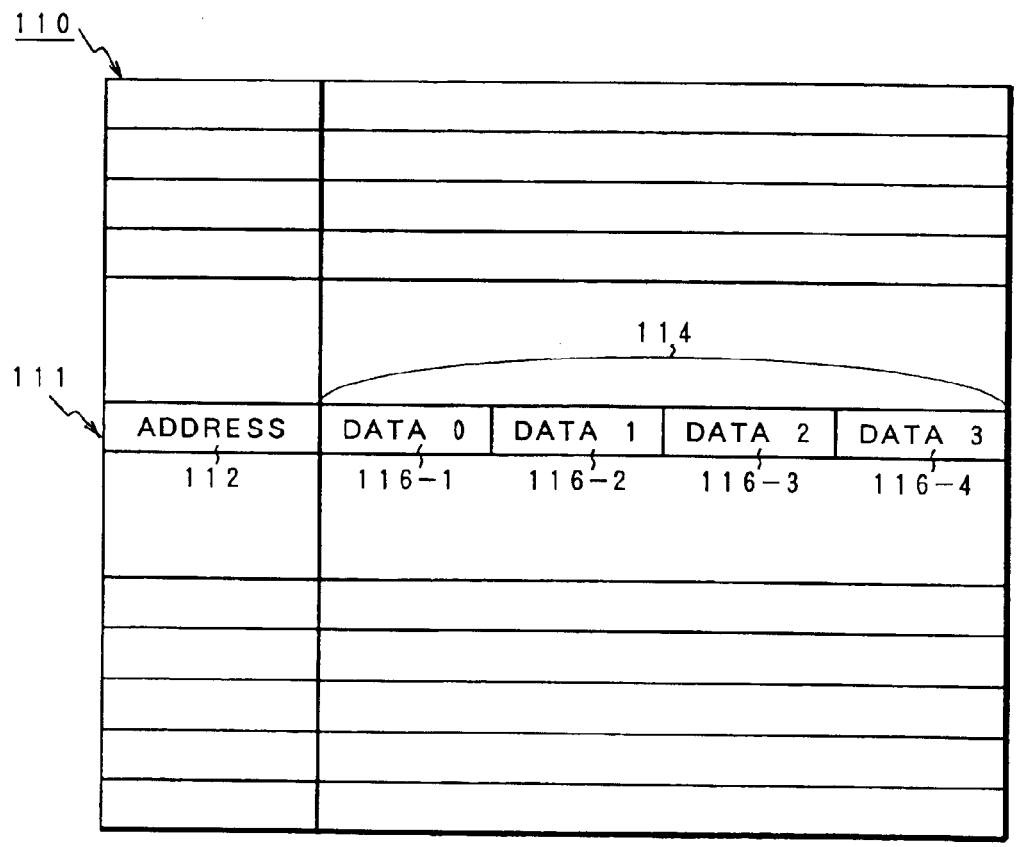
FIG. 2 is an explanatory view of a cache memory.
Figure 3A:
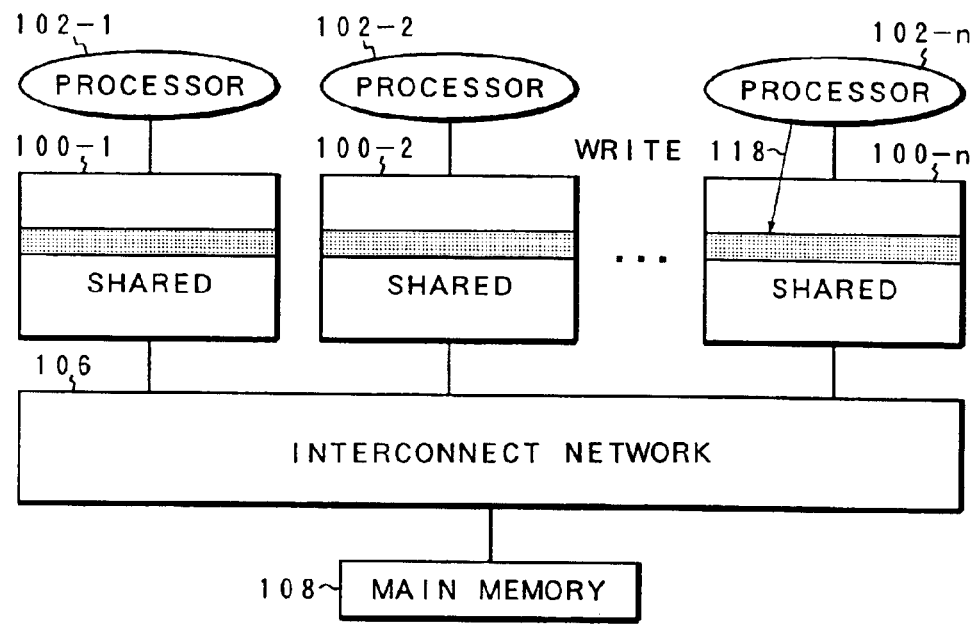
FIGS. 3A and 3B are explanatory views of a read request, which is followed by change in states of other cache devices to keep cache coherency.
Figure 3B:
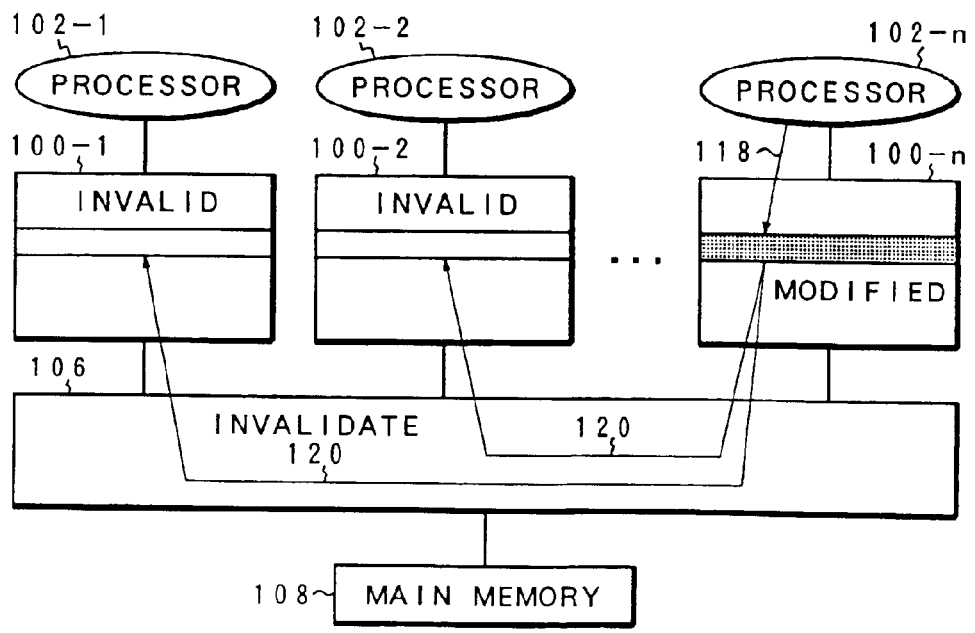
Figure 4:
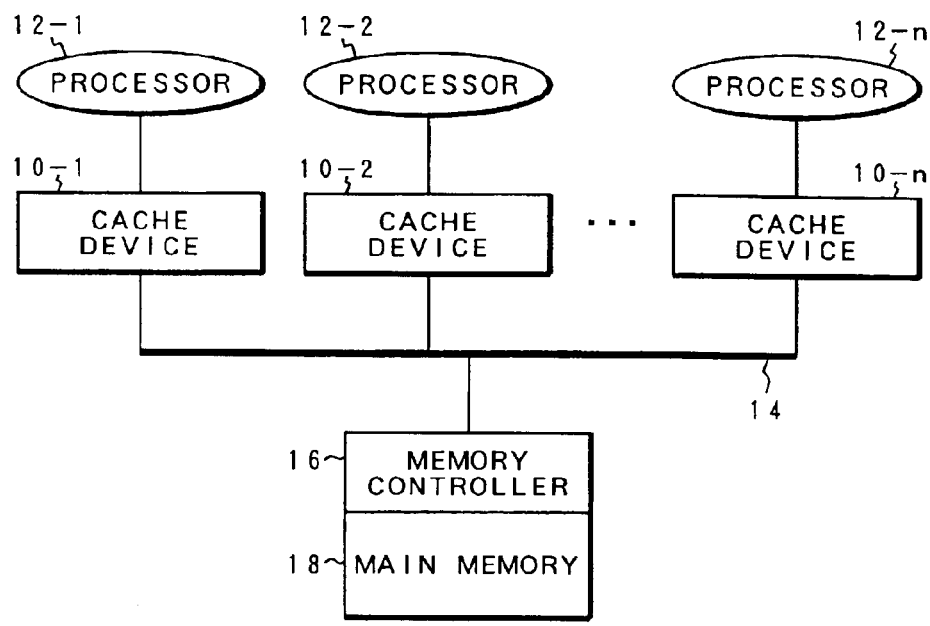
FIG. 4 is a block diagram of a multiprocessor system using cache devices of the present invention.

FIG. 4 is a block diagram of a multiprocessor system to which the cache devices of the present invention are applied. The multiprocessor has processors 12-1, 12-2, to 12-n, and the processors 12-1 to 12-n are provided with cache devices 10-1, 10-2, to 10-n of the present invention, respectively. The processors 12-1 to 12-n are interconnected through the cache devices 10-1 to 10-n to a common bus 14 as an interconnecting network. A main memory 18, the number of which is only one in the system, is connected through a memory controller 16 to the common bus 14.

Figure 5:
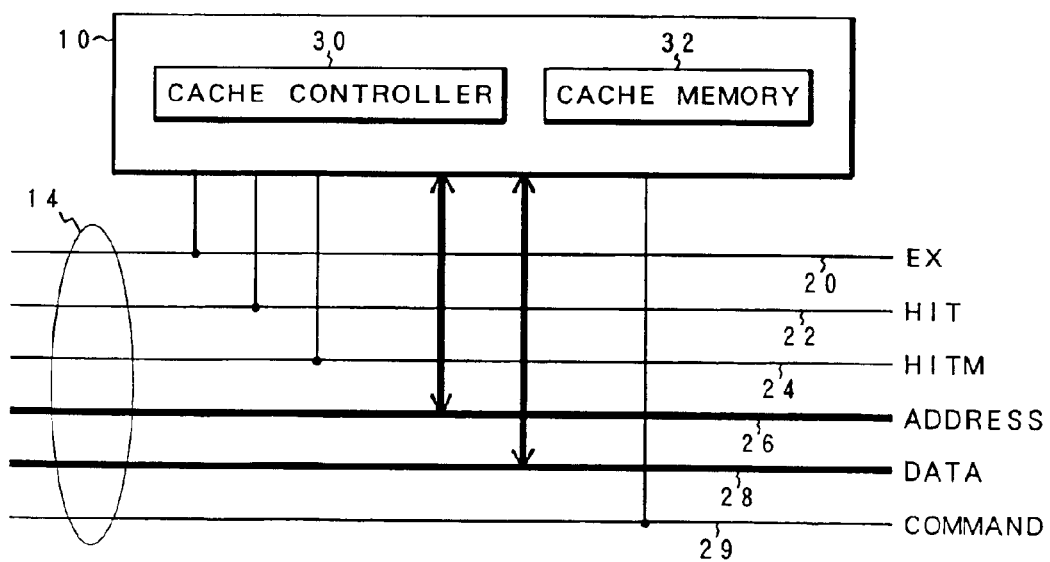
FIG. 5 is a block diagram of a circuit wherein a common bus for connecting the cache devices shown in FIG. 4 is made to a snoop bus.

FIG. 5 illustrates details of the common bus 14 to the cache device set up to the multiprocessor system shown in FIG. 4. The common bus 14 is provided with an EX line 20, a Hit line 22, and a HITM line 24, as state signal lines, into which results obtained by examining the state of the cache devices 10 are caused to flow. The common bus 14 is also provided with an address bus 26, a data bus 28 and a command bus 29. As this common bus 14, a snoop bus is used. The cache device 10 is provided with a cache controller 30 and a cache memory 32. The EX line 20, the HIT line 22 and the HITM line 24 of the common bus 14 are shared by the cache controllers 30 of the respective cache devices. These lines are defined so as to be asserted by specific timing from a memory transaction. Namely, when a certain memory transaction is generated from the cache controller 30, a request message is sent out to the common bus so that the cache controller of each of the external cache devices examines whether the data corresponding to the request address of the transaction is present in its cache memory 32 or not and, if present, what state the data falls in. The obtained result is conveyed through the EX line 20, the HIT line 22 or the HITM line 24, dependently on the examined state. As a protocol for keeping consistency of data in the cache devices of the present invention, an MESI protocol is adopted.

Figure 6A:
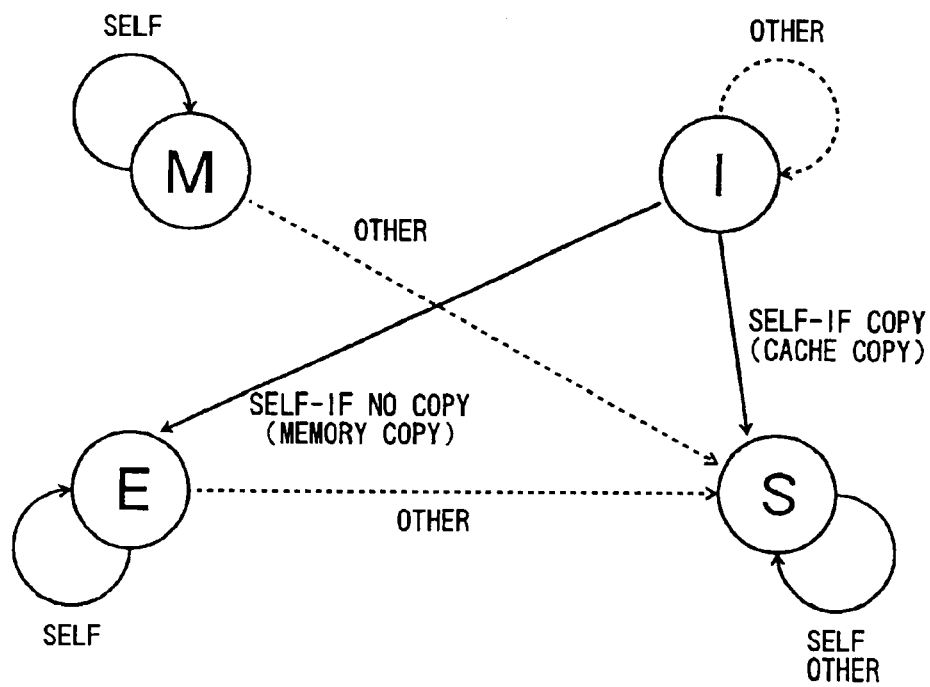
FIGS. 6A and 6B are diagrams of state transition of an MESI protocol.
Figure 6B:
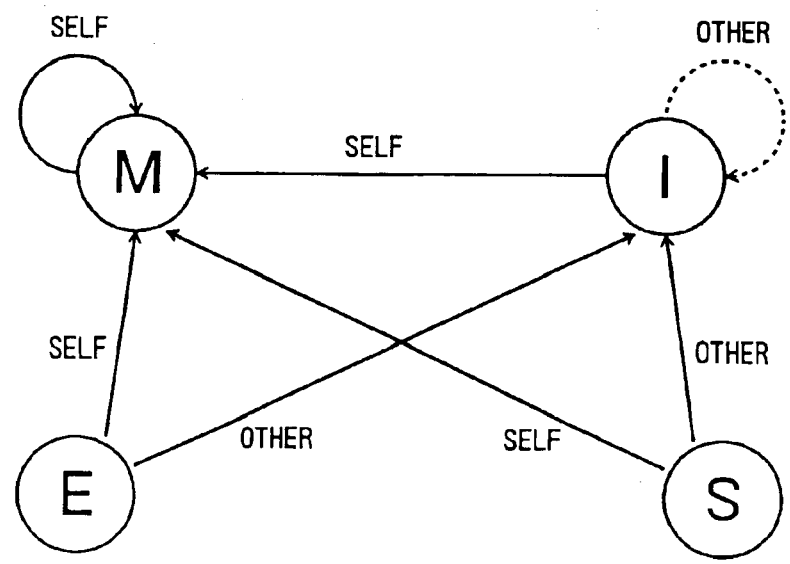

FIG. 6A illustrates state transition of the MESI protocol, in response to a read request, and FIG. 6B illustrates state transition of the MESI protocol, in response to a writing request. Symbols in the state transition in FIGS. 6A and 6B represent the following:

M: a data-modified state, in which renewed data is preserved in only one of the plural caches;

E: an exclusive state, in which valid data that is not renewed is preserved in only one of the plural caches;

S: a data-shared state, in which the same data is preserved in the plural caches;

I: an invalid state, in which data on the cache is invalid;

self: a request from the self-processor is processed;

other: a request from some other cache device is processed;

self-if-copy: the state for invalidating a read request, in which valid data is copied from some other cache; and self-if no copy: the state for invalidating a read request, in which valid data is copied from the main memory.

In the case that, in the common bus 14 shown in FIG. 5, the data corresponding to the request address of the memory transaction is present in the cache and the cache controller 30 examines the state of the data, the cache controller 30 asserts the EX line 20 on basis of this MESI protocol if the state is exclusive (E). The controller 30 asserts the HIT line 22 if the state is shared (S). The controller 30 asserts the HITM line 24 if the state is modified (M). In this manner, the cache controller 30 of each of the cache devices can judge whether the data corresponding to the request message, based on the memory transaction, sent into the common bus 14 at the present time is in the following state I, II, III, or IV:

I: the data is exclusive (E) and is preserved in any one of the caches;

II: the data is shared (S) and is preserved in the plural caches devices;

III: the data is modified (M) and is preserved in any one of the caches; and

IV: the data is present in no caches and is invalid (I).

Figure 7:
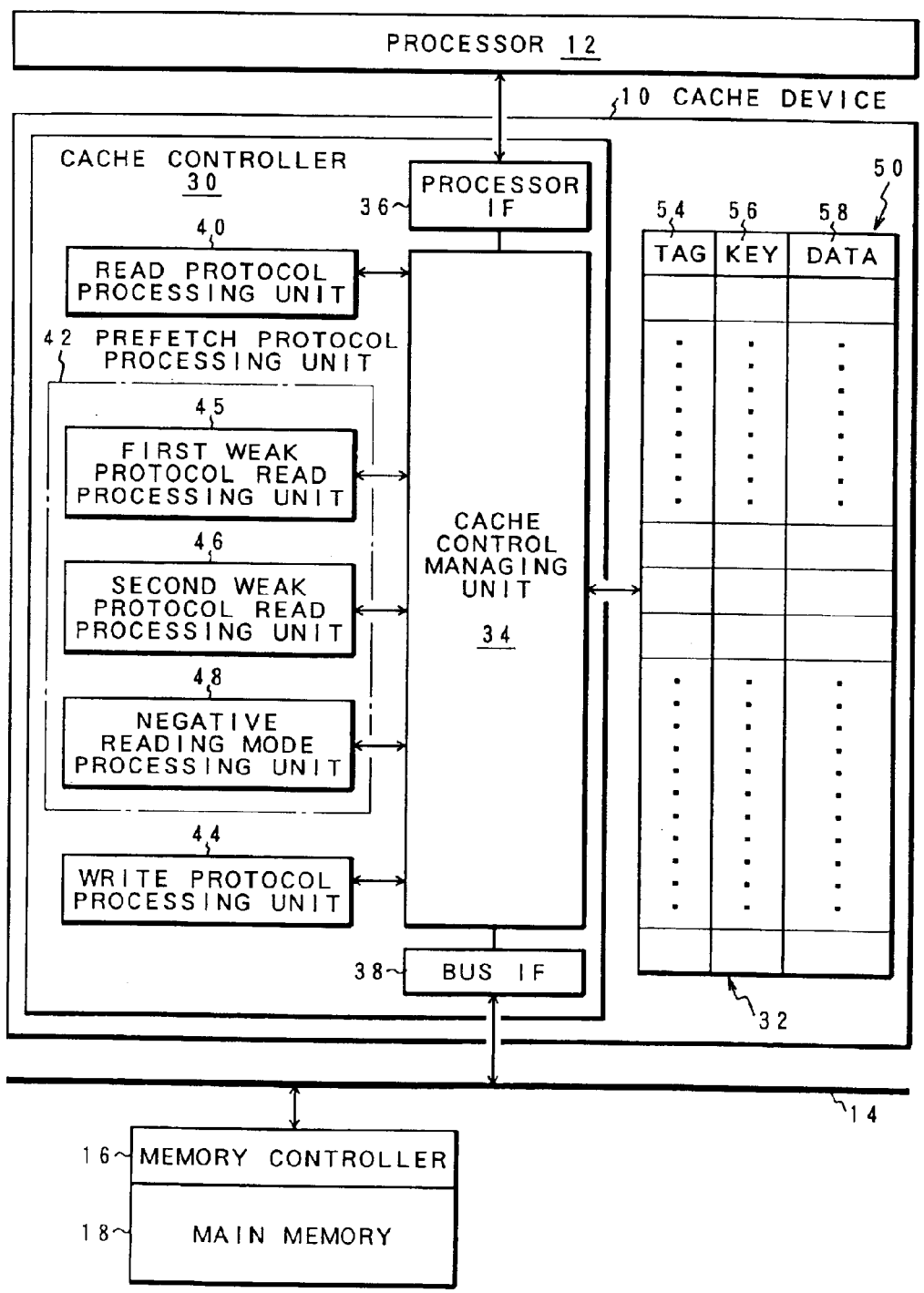
FIG. 7 is a block diagram of a cache device of the present invention.

FIG. 7 is a block diagram illustrating, in detail, functions of the cache controller 30 and the cache memory 32 in the cache device illustrated in FIG. 5. The cache device 10 is mainly composed of the cache controller 30 and the cache memory 32. The cache controller 30 manages the action of the cache memory 32, and receives a data request from the processor 12 or issues a request message to the common bus 14. The cache controller 30 also monitors traffic on the common bus 14 constantly. If a request message from some other cache device is sent into the bus, the cache controller 30 performs cache operation corresponding to this request message. The cache controller 32 is provided with a cache control managing unit 34, a processor interface 36, a bus interface 38, a read protocol processing unit 40, a pre-fetch protocol processing unit 42, and a writing protocol processing unit 44. The read protocol processing unit 40 carries out processing for cache coherency management, following normal read operation, in accordance with the MESI read protocol shown in FIG. 6A. The writing protocol processing unit 44 carries out processing for keeping data consistency, in accordance with the MESI writing protocol shown in FIG. 6B. The pre-fetch protocol processing unit 42, which is newly set up in the present invention, is composed of a first weak protocol read processing unit 45, a second weak protocol read processing unit 46 and a passive reading mode processing unit 48. In the case that, at the time of generating a pre-fetch request accompanying a memory access request of the processor 12, data stored in some other cache device cannot be read unless the state thereof is changed, the first weak protocol read processing unit 45 carries out a weak reading operation for causing failure in the pre-fetch request. In the case that, at the time of generating a pre-fetch request accompanying a memory access request of the processor 12, data stored in some other cache device cannot be read unless the state thereof is changed, the second weak protocol processing unit 46 forcibly reads the data without changing the state, sets up a weak state (W) indicating weak protocol read, and stores this state in the cache memory. The second weak protocol read processing unit 46 is combined with a memory consistency model for attaining consistency of data by software at the side of the processor 12. This unit 46 invalidates all data in the cache memory that are in the weak state (W) when the unit 46 receives a synchronization message caused to flow to attain the consistency of the data. While the first weak protocol read processing unit 45 and the second weak protocol read processing unit 46 carry out a weak reading operation when data is pre-fetched from some other cache device, the passive reading mode processing unit 48 carries out processing in the case that pre-fetch data is stored in the address corresponding to a memory access request by some other cache device. Specifically, in the case that the mode (P) representing the passive preservation mode is set and preserved at the time of storing pre-fetch data in the cache memory 32 and data corresponding to a read request by some other cache devices is the pre-fetch data to which the passive preservation mode (P) is set up, the passive reading mode processing unit 48 does not inform the other cache device of the preservation of this pre-fetch data to exclude the use of the pre-fetch data by the other caches device. In the case that data in all of the other cache devices are invalid (I) or data is preserved in the exclusive state (E) or data-modified state (M), the pre-fetch data to which the passive preservation mode (P) is set up is made invalid (I). In the case that the corresponding data is shared (S) by the other devices, the pre-fetch data is preserved as it is, that is, without changing its state. About the first weak protocol read processing unit 45, the second weak protocol read processing unit 46 and the passive reading mode processing unit 48, which are set up in the pre-fetch protocol processing unit 42 of the cache controller 30, any one of the following combinations is selectively set up by setup-processing at the time of starting the device, or the like processing:

I: a combination of the first weak protocol read processing unit 45 and the passive reading mode processing unit 48; and II: a combination of the second weak protocol read processing unit 46 and the passive reading mode processing unit 48.

Figures 8, 9:
FIG. 8 is an explanatory view of a cache line in a cache memory shown in FIG. 7.
FIG. 9 is an explanatory view of correspondence of tag bits shown in FIG. 7 and the states of stored data.

Of course, it is allowable to fixedly set up, as the function of the cache controller 30, either one function of the first or second weak protocol read processing unit 45 or 46, and the function of the passive reading mode processing unit 48. The cache memory 32 is a spot for storing a copy of a part of data in the main memory 18, and a cash line 50 is composed of a tag 54, a key 56, and a cache array 58. The cache array 58 is a spot for storing data. A copy of data in the main memory 18 and data renewed by the processor 12 are stored in the cache array 58. The cache arrays 56 are managed in a block unit. One block thereof is composed of plural data that the processor 12 processes. The tag 54 and the key 56 represent the state of each of the blocks in the cache arrays 58, and correspond to each of the cache arrays 58. As the cache memory 32, there is generally used a set associative cache, which are caused to have plural data corresponding to a certain index (the nth entry). To make description simple in the present embodiment, a direct map cache, wherein one address corresponds to one index, is used. The key 56 indicates the address, from the memory of which the data in the cache array 58 is copied. The key combined with the index defines only one address. In the case of the direct map cache, the key directly represents the address since the index and the address have one-to-one correspondence relationship. The tag 54 represents the state of the data block stored In the cache array 58. As shown in FIG. 8, the tag 54 is composed of 2 bits b1 and b2. By the 2-bit data b1 and b2 in the tag 54, data preserved by the MESI protocol shown in FIGS. 6A and 6B are as shown in FIG. 9.

[First Weak Protocol Read]

As a first embodiment of pre-fetch protocol processing in the cache devices 10 of the present invention, the following will describe pre-fetch processing by the first weak protocol read processing 45 set up in the cache controller 30. Let us suppose the case that in the multiprocessor shown in FIG. 4 a request of memory access is issued from the processor 12-1. A data request, which follows the memory access request from the processor 12-1, is sent as a request message from the cache device 10-1 to the common bus 14. Additionally, in the present invention, pre-fetch by hardware is performed in the cache device 10-1. To make description simple in the present embodiment, correspondingly to data-required addresses ADR from the processor 12-1, data in addresses (ADR+n) are pre-fetched, wherein n is a block size that is arbitrarily selected. Thus, an adjacent block or adjacent blocks are pre-fetched. Pre-fetch caused by the hardware, which accompanies the data request from the processor 12-1, is sent out as a request message of the weak read protocol to the common bus 14 by processing of the first weak protocol read processing unit 45 shown in FIG. 6. In other words, about normal read based on the data-requested address ADR from the processor 12, the cache controller 30 sends out a request message for the normal read to the common bus 14; after a reply message in response to this request message for the normal read is finished, the cache controller 30 uses the first weak protocol read processing unit 45 to send out, to the common bus 14, a request message for read based on the weak protocol for pre-fetching the required addresses ADR+n. In such a manner, normal read is distinguished from a request message for the weak protocol read. When a request message for read based on the weak protocol is issued from the cache controller 30, the other cache devices start snoop operation in the same manner as for normal read. Specifically, each of the other cache devices examines the required addresses ADR+n obtained in the request message for read based on the weak protocol, and also examines whether the data corresponding to the required addresses ADR+n are present in its own cache memory or not and, if present, what state the data fall in. In the case that the corresponding data are present in the cache memory and the data are exclusive (E), the cache controller asserts the EX line 20. When the data are shared (S), the cache controller asserts the HIT line 22. When the data are modified (M), the cache controller asserts the HITM line 24. When the data are invalid (I), the cache controller does not assert any state controlling line. The cache controller 30 of the pre-fetch request source and the main controller 16 for the main memory 18 monitor the common bus (snoop bus) 14 so that dependently on the state of the other cache devices, processing is performed as follows.

I. In the case that the EX line, the HIT line and HITM line are not asserted and are invalid (I), the pre-fetch request is regarded as success. As a result, the data read from the required addresses ADR+n are transmitted from the main memory 18 to the cache device of the request source. The cache controller 30 of the request source stores the data transmitted from the main memory 18, in the exclusive state (E), in the cache array.

II. In the case that only the HIT line is asserted (i.e., the data-shared state(S)), the cache controller 30 of the request source and the memory controller 16 for the main memory 18 regard the pre-fetch request as success. As a result, the data read from the required addresses ADR+n are read from the main memory 18 and transmitted to the cache device of the request source. The cache controller 30 of the request source stores the transmitted data, in the data-shared state (S), in the cache array.

III. In the case of the exclusive state (E), wherein the Ex line is asserted, or the data-modified state (M), wherein the HITM line is asserted, that is, in the case that the state of the cache devices of the request source must be modified by the normal read protocol, the cache controller 30 of the request source and the memory controller 16 for the main memory 18 regard the pre-fetch request as failure, and interrupt the processing.

Figure 10:
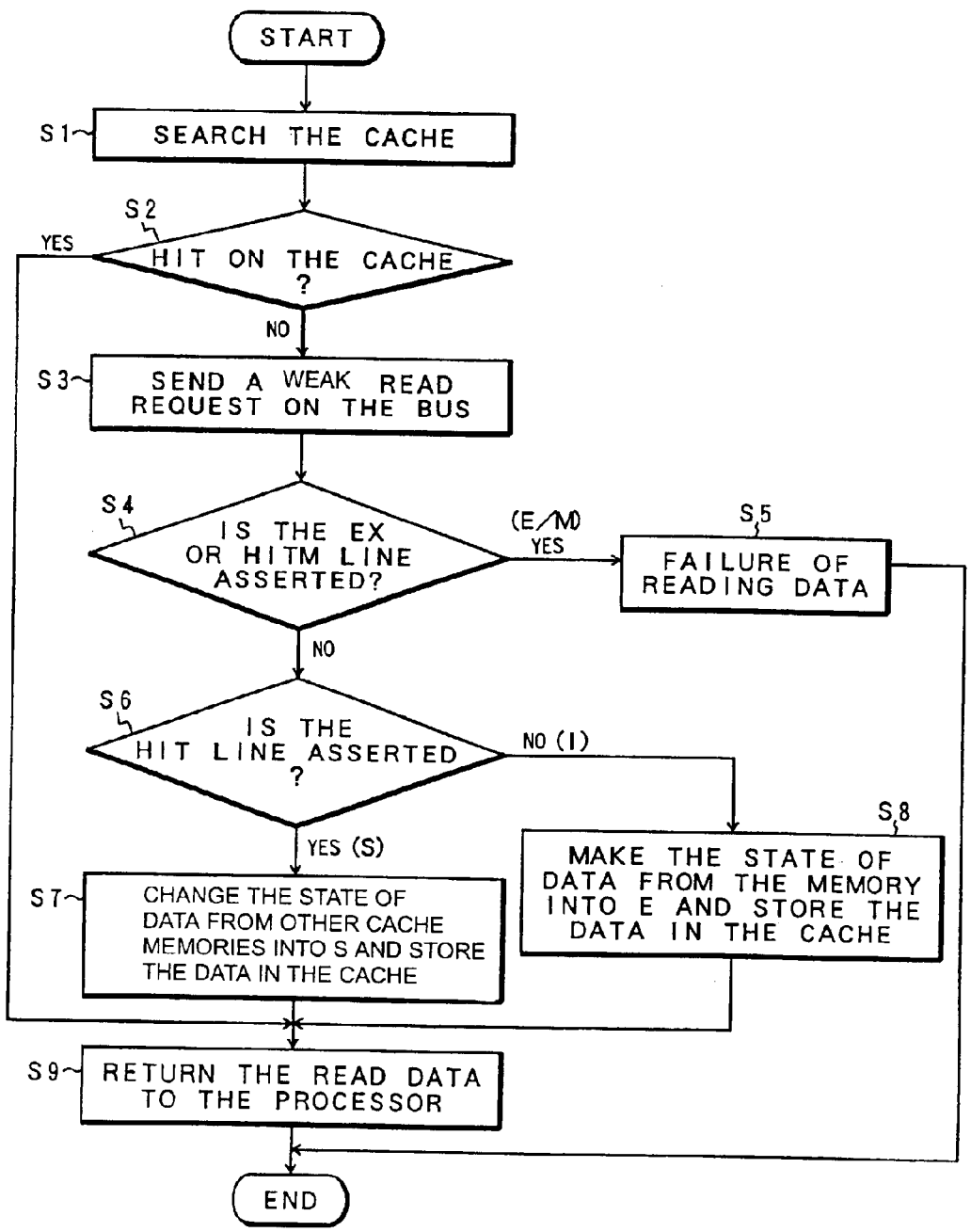
FIG. 10 is a flowchart of pre-fetch processing by first weak read.

FIG. 10 is a flowchart of pre-fetch processing by the first weak protocol read processing unit shown in FIG. 7. In the case that pre-fetch of data in the requested addresses ADR+n is requested by the hardware, which accompanies a memory request from the processor 18, in step S1 the processor 18 first searches its own cache memory 32 and then in step S2 the processor 12 judges whether or not the corresponding data are present in the cache and are hit. When the data are hit, in step S9 read data are given back to the processor and then the successive processing is finished. When the corresponding data are not present in the cache and are not hit in step S2, in step S3 a request message for read based on the weak protocol is sent into the common bus 14. In response to the request message for read based on the weak protocol, in each of the other cache devices it is examined whether the data corresponding to the requested addresses ADR+n are stored and, if stored, the state of the data is examined. As a result, the corresponding state controlling line is asserted. In step S4, it is first checked whether or not the state is the exclusive state (E) based on assertion of the EX line or the data-modified state (M) based on assertion of the HITM line. If the state controlling line corresponding to the exclusive state (E) and the data-modified state (M) is asserted, the present processing goes to step S5 so that the reading of the pre-fetch-requested date is regarded as failure and the processing is finished. If the EX line or the HITM line is not asserted in step S4, the processing goes to step S6 so that it is checked whether or not the present state is the data-shared state (S) based on assertion of the HIT line. If the HIT line is asserted, the present state is the data-shared state (S). Therefore, the processing goes to step S7, so that data in the requested addresses ADR+n are read and transmitted from the main memory 18 and then the data are made into the data-shared state (S) and stored in the cache array. If the HIT line is not asserted in step S6, the present state is the invalid state (I). Thus, the present processing advances to the step S8, so that data in the requested addresses ADR+n are read and transmitted from the main memory 18 in the same manner and then the data are stored in the exclusive state (E) in the cache array. As described above, in the case that it is necessary to modify the other cache devices by pre-fetch, that is, in the case that the data corresponding to pre-fetch are being stored in the exclusive state (E) or the data-modified state (M) in the other cache devices, the pre-fetch request is made to a read operation based on the weak protocol and the reading of the pre-fetch-requested data is regarded as failure to interrupt the processing. Thus, when the processor accesses the data in the exclusive state (E) or the data-modified state (M) in some other cache devices, in the cache devices in which the same data is stored as pre-fetch data an operation for making their data state into the data-shared state (S) becomes unnecessary. It is also possible to reduce overhead at the time of writing by the processor in the cache device in which data is stored in the exclusive state (E) or the data-modified state (M).

[Second Weak Protocol Read]

The following will describe pre-fetch processing by the second weak protocol read processing unit 46 set up in the cache controller 30 shown in FIG. 7. A difference between the second weak protocol read and the first weak protocol read is in the structure of the tag 54 in the cache line 50. The tag 54 has not only the 2-bit data b1 and b2 representing the state of data in the cache array 58 but also a tag representing a weak state (W) indicating that the data is pre-fetched by the second weak protocol read. Therefore, it can be said that the second weak protocol read is a MESIW protocol wherein the (W) state is added to the MESI protocol shown in FIG. 6A. This weak state (W) represents pre-fetch data in the state that the order of memory transactions is renewed and results of writing are not reflected. In the processing of the second weak protocol read, weak consistency is adopted as a memory consistency model for keeping consistency of data between memories by software. The weak consistency is a model in which the order of sync messages for synchronization operation and memory transactions between the sync messages is arbitrary, and in which a sync message must be sent out without fail when synchronization is necessary between processors. Such a weak consistency model is described in, for example, "Various definitions of a memory consistency model and an example of a commentary thereon", pp. 157–158, written by Kazuki Joh in "Parallel Processing Symposium JSPP, 97" on May in 1997. If this weak consistency model is adopted, data on which results written in a cache by pre-fetch are not reflected may be present in other cache devices. However, in the case that a sync message is issued, synchronization operation is not finished so far as results written in a certain cache device is not reflected on the other cache devices. Such a weak consistency model is used and in the second weak protocol read there is adopted a manner of attaining normal finishing of a pre-fetch request that results in failure by the first weak protocol read, which has already been described, by success in reading the pre-fetch request.

Let us suppose that a memory access request is issued, for example, from the processor 12-1 to the cache device 10-1 in the multiprocessor system shown in FIG. 4. Concerning the data request from the processor 12-1, a request message corresponding to data-requested address ADR is sent out, in accordance with normal read by the read protocol processing unit 40 set up in the cache controller 30 shown in FIG. 7, into the common bus 14. Since pre-fetch is performed by the hardware in the cache devices of the present invention, data in the requested addresses ADR+n are sent, for the pre-fetch request, in response to the data-requested address ADR. This pre-fetch request is sent, as a request message for read based on the weak protocol by the second weak protocol read processing unit set up in the cache controller 30 shown in FIG. 7, into the common bus 14. When the request message in the accordance with the second weak protocol is issued from the cache controller 30, the other cache devices start snoop operation in the same manner as in normal read. Specifically, each of the other cache devices examines the required addresses ADR+n, and also examines whether the data corresponding to the required addresses are present in its own cache memory or not and, if present, what state the data fall in. In the case that the corresponding data are present in the cache memory and the data are exclusive (E), the cache controller asserts the EX line. When the data are shared (S), the cache controller asserts the HIT line. When the data are modified (M), the cache controller asserts the HITM line. When the data are invalid (I), the cache controller does not assert any state controlling line. In this manner, all of the cache devices and the memory controller 16 are informed of data-preservation state of the data in the addresses ADR+n requested for the pre-fetch. The cache controller 30 of the request source and the memory controller 16 for the main memory 18 monitor the common bus (snoop bus) 14. In the case that neither the EX line, the HIT line nor HITM line are asserted and they are invalid (I), the pre-fetch request is regarded as success. As a result, the data are transmitted from the main memory 18 to the cache device of the request source. The cache controller 30 of the request source stores the transmitted data, in the exclusive state (E), in the cache array. In the case that only the HIT line is asserted (i.e., the data-shared state(S)), the pre-fetch request is also regarded as success. As a result, the data in the required addresses are transmitted from the main memory 18 to the cache device of the request source. The cache controller 30 of the request source stores the transmitted data, in the data-shared state (S), in the cache array. In the case of the exclusive state, wherein data-change is necessary and the EX line is asserted in normal read, the pre-fetch request is also regarded as success in the second weak protocol read. As a result, the data in the required addresses are transmitted from the main memory 18 to the cache device of the request source. In this case, the cache controller 30 of the request source stores the transmitted data, in the weak state (W), in the cache array. In the case of the data-modified state (M), wherein the HITM line is asserted, the cache controller 30 of the request source and the memory controller 16 for the main memory 18 perform either of the following I, II or III:

I. in the accordance with the second weak protocol read, the pre-fetch request is regarded as success so that the data are transmitted from the main memory 18 to the cache device of the request source, and stored in the weak state (W), II. in the same way as in normal memory transaction, readout is caused to succeed by writing-back, and III. in the same way as in first weak read protocol, the pre-fetch request is regarded as failure so that the processing is interrupted.

Figure 12:
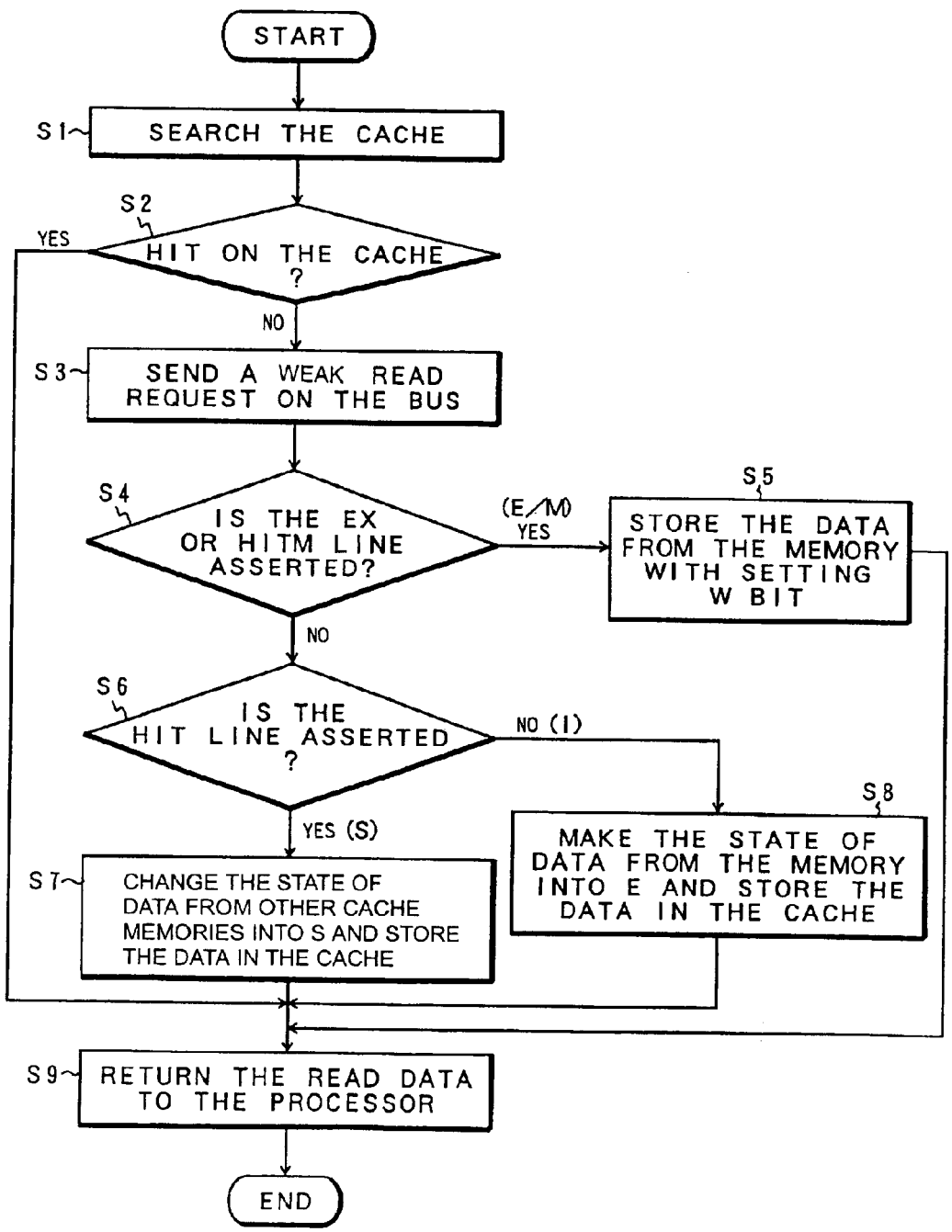
FIG. 12 is a flowchart of pre-fetch processing by the second weak read.

FIG. 12 is a flowchart of pre-fetch processing by the second weak protocol read. In the case that pre-fetch of data in addresses ADR+n is requested through the hardware by a requested address ADR, which accompanies a memory request from the processor 12, in step S1 the processor 12 first searches its own cache memory 32 and then the processor 12 examines whether or not the data in the requested addresses ADR+n are present in the cache array. When the data are present in the cache array and hit in step S2, in step S9 read data are given back to the processor 12 and then the processing is finished. When the data in the requested addresses are not present in the cache array, in step S3 a request message based on the second weak protocol is sent into the common bus 14. In response to this request message, in each of the other cache devices it is examined whether the data in the requested addresses ADR+n are stored and, if stored, the state of the data is examined. The state controlling line corresponding to the result is then asserted. In the case of the exclusive state (E), wherein the EX line is asserted, or the data-modified state (M), wherein the HITM line is asserted, in step S4, the present processing goes to step S5 so that the data in the requested address ADR+n are read out from the main memory 18, and are then transmitted to the cache array and stored therein in the state that a bit of the weak state (W) is set up. If the neither EX line nor the HITM line is asserted in step S4, the processing goes to step S6 so that it is checked whether or not the HIT line is asserted. In the case of the data-shared state (S), wherein the HIT line is asserted, the processing goes to step S7 so that the transmitted data in the requested address ADR+n from the main memory 18 are stored, in the data-shared state (S), in the cache array. In the case of the invalid state (I), wherein the HIT line is not asserted in step S6, the processing goes to step SB, so that the data in the requested addresses ADR+n are transmitted to the cache array and stored, in the exclusive state (E), therein. When a synchronization message is issued form any one of the processors at the stage of performing the pre-fetch processing in accordance with the above-mentioned second weak protocol read, the cache controllers of the respective cache devices stop receipt of any new transaction until all of the transactions that are being processed finish. At the same time, a sync message is sent out into the common bus 14 to inform the cache controllers in all the cache devices of synchronization processing. The cache controller 30 that received the sync message examines the tag 54 onto the cache array 58 in its own cache memory 32 to search the data in the weak state (W). All data in the weak state (W) found out by this search are changed into the invalid state (I) to be invalidated. The synchronization processing based on the synchronization message from the processor is completed by the end of the invalidation of the data in the weak state in all the cache devices. When the data in the exclusive state (E) or the data-modified state (M) are pre-fetched from the main memory to other cache devices (the pre-fetch follows a pre-fetch request), it is also possible in the pre-fetch processing based on the second weak protocol read to prevent change in the states of the other cache devices from being caused. The pre-fetched data can be forcibly invalidated regardless of the change in the states of the other cache devices by the synchronization operation in the memory consistency model. In this manner, it Is possible to reduce, without invalidating data newly, overhead at the time of writing data (i.e., overhead when, in the cache devices in which data in the exclusive state (E) or the data-modified state (M) is stored, the writing of their processors is caused).

[Passive Preservation Mode]

The following will describe a passive preservation mode, for preserving pre-fetched data in the cache, by the passive reading mode processing unit 48 set up in the cache controller 30 in FIG. 7. This passive preservation mode is a protocol for invalidating pre-fetched data when data in the address equal to the address of the pre-fetched data preserved in the cache is requested by some other cache device.

Figure 13:
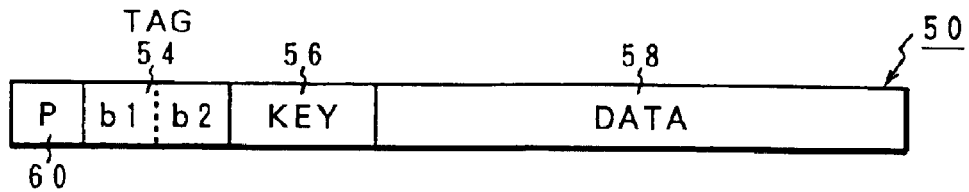
FIG. 13 is an explanatory view of a cache line for setting a passive preservation mode (P)

FIG. 13 illustrates a cache line 50 to which the passive preservation mode is applied. A preservation mode distinguishing tag 60 is newly fitted up thereto. In this preservation mode distinguishing tag 60, the following is set up: a symbol representing an (N) mode (normal mode) indicating normal preservation, or a symbol representing a (P) mode (passive mode) indicating passive preservation concerned with the present invention. The state of data based on 2-bit data b1 and b2 in the tag 54 is either one of MESI shown in FIG. 9. In this case, the data-modified state (M) is not caused when data is preserved in the (P) mode, which is a passive preservation manner. Specifically, in the same way as in the transition states of the MESI protocol shown in FIG. 6B, transition to the data-modified state (M) is caused when in the exclusive state (E) or the data-shared state (S) in the (P) mode the processor 12 performs renewal by data-writing. In this case, an invalidating message is sent out into the common bus to invalidate data stored in the other cache devices. Transition to the data-modified state (M) is then attained. At this time, therefore, the pre-fetched data is lost so that the (P) mode is changed to the (N) mode. Accordingly, any data in the (P) mode does not fall in the data-modified mode (M).

On the other hand, about mode control in the case that data is in the (P) mode when the data is read from any one of the cache arrays, the following methods can be adopted:

I. the normal read mode is given to change the (P) mode to the (N) mode,

II. a reading request from the processor is finished without changing the (P) mode, and III. a reading request from the processor is finished without changing the (P) mode, and subsequently the normal read mode is given to change the data from the (P) mode to the (N) mode.

In the present embodiment, the above-mentioned method 11, which is the simplest method, is adopted. About data stored in the (P) mode, no result of examination of the state of the cache is outputted in the response to a request message sent from some other cache devices to the common bus, and the data stored in the (P) mode does not change whether the data falls in the exclusive state (E) or the data-shared state (S). Therefore, the state of the data stored in the (P) mode is either of the invalid state (I), or the exclusive state (E) or the data-shared state (S). It is possible in each of the cache memories 32 to store data read by normal data-readout in the (N) mode and store data read by pre-fetch in the (P) mode, which is a passive preservation manner, in each of the cache lines in the cache memory 32.

In the case that data is stored in the (P) mode in any one of the cache memories, the cache controller 30 for causing the data to be stored in the (P) mode carries out the following operation through the function of the passive reading mode processing unit 48 shown in FIG. 7 when a request message based on the normal read or the weak protocol read is sent out into the common bus by a memory access request from some other cache devices. First, the state-examination-result based on the request message sent into the common bus 14 is waited. In this case, the cache controller 30 in which the data in the (P) mode is stored does not assert any of the EX line, the HIT line and the HITM line regardless of the state of the cache so that to the other cache controllers appear the invalid state (I) when they are observed from the outside. In the case that any of the EX line, the HIT line and the HITM line is not asserted on the basis of the result of state-examination in the other cache devices, that is, in the case that the cache controllers other than the cache controller for causing the data in the (P) mode to be stored are invalid (I), this controller 30 changes the state of the data in the (P) mode to the invalid state (I) in order to invalidate its own data. In this manner, the other cache controller which issued the read request can read data in the requested address, in the exclusive state (E), from the main memory 18 and cause the data to be stored. In the case that the Ex line or the HITM line is asserted and the data is stored, in the exclusive state (E) or the data-modified state (M), in any one of the other cache devices, the cache controller 30 for causing the data to be stored in the (P) mode changes the state of the data in the (P) mode to the invalid state (I). On the other hand, in the case that the other cache controllers are in the data-shared state (S), wherein the HIT line is asserted, on the basis of the result of the state-examination of the other controllers the cache controller 30 for causing the data in the (P) mode to be stored does not need to change its own data.

Figure 14:
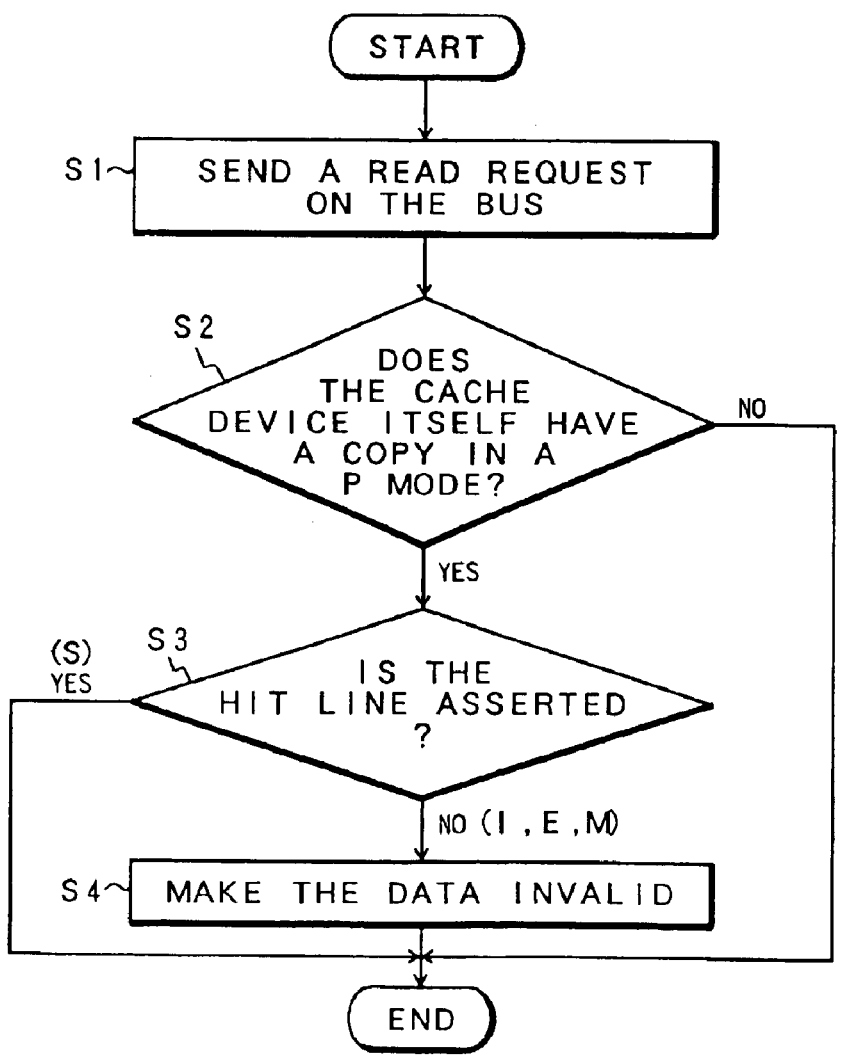
FIG. 14 is a flowchart of pre-fetch processing to the data preserved in the passive preservation mode (P)

FIG. 14 is a flowchart of operation of the cache device in which data in a requested address is stored in the (P) mode when a request message based on read from some other cache device is sent out in the common bus. In step SI, a request message based on read from some other cache device is sent out into the common bus 14. As a result, the cache device checks whether or not the cache device itself stores data in the address requested by the request message as a copy in the (P) mode (passive preservation) in step S2. If the cache device stores the data in the requested address in the (P) mode, it is checked whether or not the HIT line is asserted in step S3. If the Hit line is not asserted, that is, if all of the other cache devices are in the invalid state (I) or either one thereof is in the exclusive state (E) or the data-modified state (M), the state of the data in the (P) mode is made invalid (I) in step S4. In the case of the data-shared state (S), wherein the HIT line is asserted, in step 3, the invalidation in step S4 is skipped and the present processing is finished since it is unnecessary to change the state of the data stored in the (P) mode. By making data pre-fetched into any one of the caches into the (P) mode, which is a passive preservation mode, as described above, useless sharing of the data by pre-fetch based on read from other cache devices can be avoided as much as possible and overhead at the time of writing specified data in the data-shared state can be reduced.

[Integration of a Request and a Reply]

Figure 15:
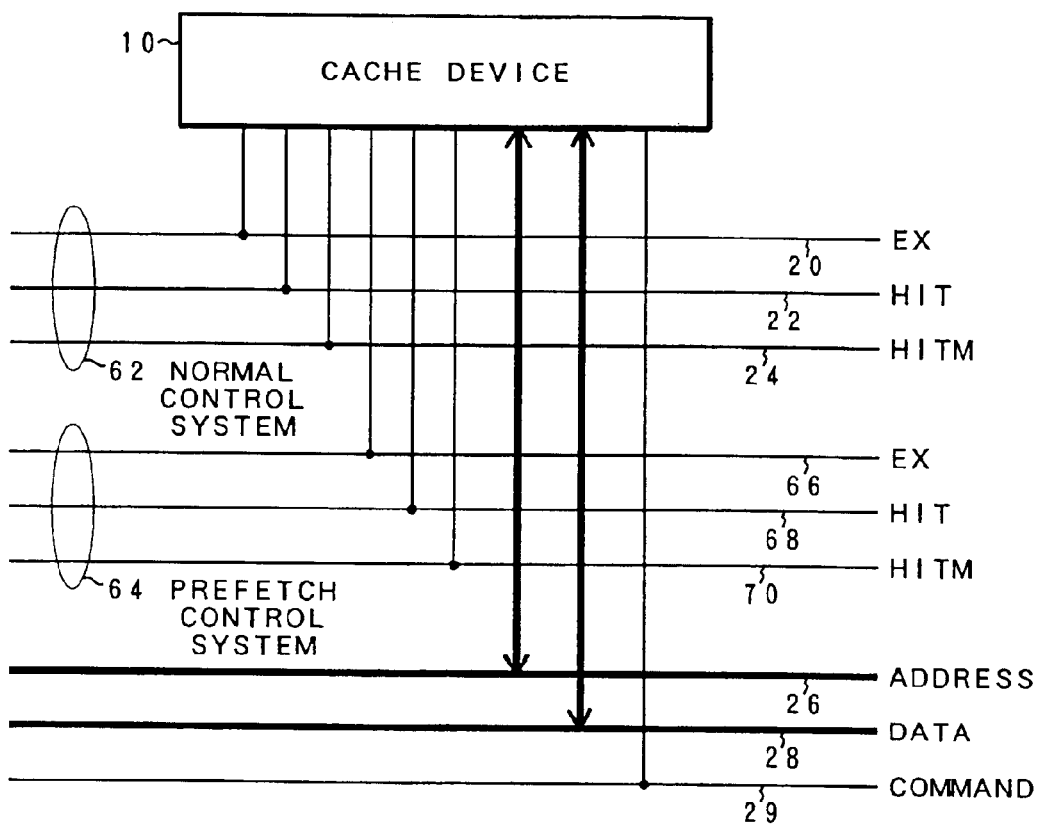
FIG. 15 is a circuit block diagram of a snoop bus making it possible to carry out state detection by a read request and state detection by a pre-fetch request at the same time.
Figure 16:
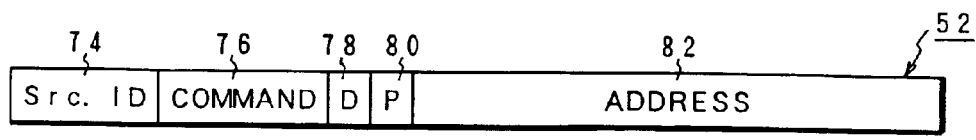
FIG. 16 is an explanatory view of a request format wherein a pre-fetch request is embedded in a read request.

FIG. 15 illustrates an embodiment of a cache device and a common bus for putting a normal memory request, a pre-fetch request and a reply together and transmitting them when the two requests overlap with each other. A common bus 14 has two state controlling lines for sending out results of the states of cache devices, that is, two systematic lines. One is a normal control system line 62, and the other is a pre-fetch system line 64. Specifically, the normal control system line 62 has an EX line 20, a HIT line 22 and a HITM line 24 in the same manner as shown in FIG. 5. The pre-fetch control system 64 has an EX line 66, a HIT line 68 and a HIT line 70. Of course, the common bus 14 has not only the normal control system line 62 and the pre-fetch control system line 64 but also an address bus 26, a data bus 28 and a command bus 29. When a cache controller of the cache device 10 receives a reply message based on normal read through the common bus 14, the controller sends out the result obtained by examining the state of data in a requested address to the normal control system line 62. When the cache controller receives a reply message in response to a pre-fetch request, the controller sends the state of data in a requested address to the pre-fetch control system line 64. As shown by the cache line in FIG. 13, the preservation of data in the cache device 10 is data-preservation in which the (P) mode, which is a passive preservation manner, is set in the preservation mode distinguishing tag 60. The cache controller in the cache device 10 using the normal control system line 62 and the pre-fetch control system line 64 adopts a manner of putting a normal read request and a pre-fetch request together into a request message in response to a data read request from the processor. When a data request is sent out from the processor 12 in the cache device 10 shown in FIG. 5, a request message in accordance with a normal data request and a request message for a data request for pre-fetch using the weak protocol read are successively and separately sent out to the common bus 14. The embodiment shown in FIG. 15 has a function that when a normal data request from the processor is received and then a request message for a data request is sent out to the common bus 14, the main controller 16 for the main memory 18 and other cache devices interpret that the message includes not only the normal data request but also a data request based on the weak protocol for pre-fetch. In other words, the memory controller 16 for the main memory and other cache devices interpret that a request message which requests data in an address ADR and is sent out from the cache device of the request source to the common bus 14 serves both as the normal data request and a pre-fetch request of data in addresses ADR+n. In this manner, it is unnecessary to sent out the request message for normal read request and the accompanying request message for pre-fetch based on the weak protocol read separately from the cache device of the request source to the common bus 14. Thus, overhead of excessive requests can be reduced. In the case that any one of the cache devices has data to be pre-fetched by accompaniment of a normal data request in its own cache memory, the cache device does not need to sent out a data request for pre-fetch based on the weak protocol to the common bus. Thus, a request message having a request format 72 shown in FIG. 16 is sent out. This request format 72 has a request source ID 74, a command 76, a normal data validity bit 78, a pre-fetch data validity bit 80 and an address 82 in this order. Thus, as shown In a request side in FIG. 18, either one of request messages for requesting normal data and pre-fetch data, for requesting only normal data or for requesting only pre-fetch data can be selectively issued by controlling a bit D in the normal data validity bit 78 or a bit B in the pre-fetch data validity bit 80. Any one of the cache devices can inform, at a time, the other cache devices of both results obtained by examining the states of the normal data and the pre-fetch data, in response to a normal data request and a pre-fetch data request issued in one request message, by setting up the normal control system line 62 and the pre-fetch control system line 64 in connection with such a request message making it possible to request the normal data and the pre-fetch data together.

Figures 17, 18:
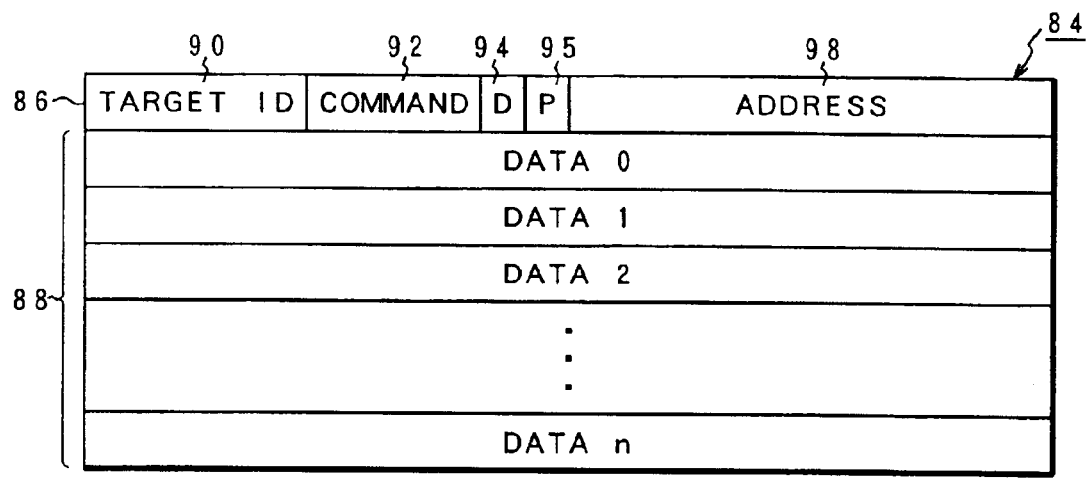
FIG. 17 is an explanatory view of a reply format to the request format shown in FIG. 16.
FIG. 18 is an explanatory view of correspondence of the reply shown in FIG. 17 to the request shown in FIG. 16.

In this embodiment, a replay format 84, for giving back data at a time in response to a request message for requesting normal data and pre-fetch data at the same time is adopted, as shown in FIG. 17. The replay format 84 is composed of a header section 86 and a data section 88. The header section 86 has a request source ID 90, a command 92, a normal data validity bit 95, a pre-fetch data validity bit 96, and an address 98. If the D bit in the normal data validity bit 95 is valid, data 0 read in response to a normal data request is added to the rear of the header section 86. If the bit B in the pre-fetch data validity bit 96 is valid, data 1 to n for pre-fetch, which correspond to n blocks that are beforehand decided, are arranged in the rear of the data 0. The relationship between the reply format 84 and the request format 72 is as shown in FIG. 18. Specifically, when the request message is "normal+pre-fetch", the reply message is "normal+pre-fetch" or "normal" only. When the request message is "normal" only, the reply message is also "normal" only. When the request message is "pre-fetch" only, the reply message is also "pre-fetch" only. Even if a normal memory request and a pre-fetch request overlap with each other, the two requests can be transmitted in a lump by putting the two requests and the replay together into one unit and further setting up two system state controlling lines (snoop buses) for conveying results obtained by examining the states of normal data and pre-fetch data in the cache devices. Thus, overhead based on an increase in data-transmission can be made as small as possible.

In the above-mentioned embodiments, as an example of the common bus that connects cache devices of a multiprocessor, a snoop bus is used. However, an appropriate common bus as an interconnecting network having an equivalent function may be used. The above-mentioned embodiments are examples of data consistency management based on the MESI protocol, but a cache coherence protocol, as well as this protocol, may be used. The present invention includes appropriate modifications so far as they neither damage the object nor the advantages thereof. Furthermore, the present invention is not limited by the numbers described in the embodiments.

[Industrial Applicability]

As described above, according to the cache device of the present invention, by using weak reading operation for pre-fetch of a multiprocessor system, useless sharing of pre-fetch data and normal data can be avoided as much as possible. Thus, overhead of writing on the cache device can be made small.

Furthermore, by embedding a pre-fetch request accompanying a normal read request in the normal request and uniting normal read and a reply to pre-fetch, overhead of the data-transmission, resulting from an increase in pre-fetch, can be suppressed

What is claimed is:

1. A cache device set up in each of processors, interconnected to other cache devices in other processors and connected to a main memory, which comprises:
   a cache memory wherein a part of data in the main memory is stored in one or more cache lines and a state tag used to manage data consistency is set up in each of the cache lines, and
   a cache controller performing, as a pre-fetch protocol, a weak read operation that fails a pre-fetch request following a read request from one of the processors, if at a time of generation of the pre-fetch request, the state tags of other cache devices must be changed to read the data stored in the other cache devices.

2. The cache device according to claim 1, wherein said cache memory distinguishes the stored data by a data-modified state (M), an exclusive state (E), a data-shared state (S) and an invalid state (I), each of which indicates validity of the state tag, and
   said cache controller causes failure in said pre-fetch request when the data corresponding to the pre-fetch request stored in the other cache devices is in the data-modified state (M) or the exclusive state (E).

3. The cache device according to claim 1, wherein said cache controller reads, when the data corresponding to the pre-fetch request and stored in the other cache devices is in the invalid state (I), the same data from said main memory and stores the same data in the exclusive state (E) in the cache memory; and when the data is in the data-shared state (S), the cache controller reads the data from the other cache devices and stores the data in the data-shared state (S) in the cache memory.

4. The cache device according to claim 1, wherein said cache memory distinguishes the stored data by a data-modified state (M), an exclusive state (E), a data-shared state (S) and an invalid state (I), each of which indicates validity of the state tag, and
   said cache controller reads, when the data which corresponds to the pre-fetch request and are stored in the other cache devices is in the data-modified state (M) or the exclusive state (E), the data without changing the state tag and stores the data in the cache memory with the setup of the weak state (W), and at the time of synchronization operation of the memory consistency the cache controller changes the weak state (W) into the invalid state (I) wholly.

5. The cache device according to claim 4, wherein said cache controller reads, when the data corresponding to the pre-fetch request and stored in the other cache devices is in the invalid state (I), the same data from said main memory and stores the same data in the exclusive state (E) in the cache memory; and when the data is in the data-shared state (S), the cache controller reads the data from the other cache devices and stores the data in the data-shared state (S) in the cache memory.

6. The cache device according to claim 1, wherein said cache controller carries out, when the cache controller receives the read request from said processor, a pre-fetch request for pre-fetching data in one or more addresses adjacent to a read-requested address after said read request.

7. The cache device according to claim 6,
   wherein the cache device is interconnected to the other cache devices via a snoop bus for outputting, when said cache controller receives a read request from its own processor or some other cache devices, preservation states of the corresponding data into state controlling lines,
   wherein the state controlling lines comprise a first state controlling line that exclusively corresponds to the read request and a second state controlling line that exclusively corresponds to the pre-fetch request,
   wherein the cache controller carries out the read request and the pre-fetch request at same time, and carries out, via the first and second state controlling lines, the states of the respective cache devices about an address of the requested data and an address of the pre-fetch requested data at same time.

8. The cache device according to claim 6, wherein in response to the simultaneous requests of said read request and the pre-fetch request, a distinguishing bit for distinguishing data in response to said read request and data in response to the pre-fetch request is fitted up to a response header, and data making the distinguishing bit valid are transmitted in a lump.

9. A cache device set up in each of processors, interconnected to other cache devices in other processors and connected to a main memory, which comprises:
   a cache memory wherein a part of data in the main memory is stored in one or more cache lines and a state tag used to manage data consistency is set up in each of the cache lines, and
   a cache controller in response to a pre-fetch request following a read request from one of the processors, reading data without changing state tags of other cache devices and storing the read data in the cache memory with setup of a weak state (W), if at a time of generation of the pre-fetch request, the state tags of the other cache devices must be changed to read the data stored in the other cache devices, and invalidating the data stored in the cache memory in the weak state W at a time of synchronization operation of memory consistency to attain data-consistency by software.

10. The cache device according to claim 9, wherein said cache controller carries out, when the cache controller receives the read request from said processor, a pre-fetch request for pre-fetching data in one or more addresses adjacent to a read-requested address after said read request.

11. A cache device set up in each of processors, interconnected to other cache devices in other processors and connected to a main memory, which comprises:
   a cache memory wherein a part of data in the main memory is stored in one or more cache lines and a state tag used to manage data consistency is set up in each of the cache lines, and
   a cache controller controlling a pre-fetch protocol according to a process comprising:
      setting as a state tag, at a time of generation of a pre-fetch request following a read request from one of the processors, a passive preservation mode P to data pre-fetched from other cache devices or from the main memory,
      storing the pre-fetched data in said cache memory,
      not informing the other cache devices of the preservation of the data in said cache memory, when data for a read request from the other cache devices corresponds to the pre-fetch data to which said passive preservation mode P is set, and
      invaliding the pre-fetched data in the cache memory, when according to the read request from the other cache devices, none of the other cache devices store the corresponding data, and preserving said pre-fetch data as it is, when according to the read request from the other cache devices, the other cache devices share the corresponding data.

12. The cache device according to claim 11, wherein said cache memory distinguishes the stored data by a data-modified state (M), an exclusive state (E), a data-shared state (S) and an invalid state (I), each of which indicates validity of the state tag, and in the case that the data corresponding to the read request from some other cache device is the pre-fetch data to which said passive preservation mode P is set up, said cache controller changes the pre-fetch data stored in the passive preservation mode P into the invalid state (I) when all of the other cache devices are in the invalid state (I), or either one of the other cache devices is in the data-modified state (M) or the exclusive state (E), and the cache device keeps the state of the pre-fetch data stored in the passive preservation mode P as it is when the other cache devices are in the data-shared state (S).

13. The cache device according to claim 11, wherein a normal preservation mode N is set up to data other than the pre-fetch data in the passive preservation mode P stored in said cache memory, and data-preservation in the passive preservation mode P and data-preservation in the normal preservation mode N are carried out in the respective cache lines, and caused to exist together.

14. A method of controlling a cache system wherein cache devices set up in respective processors are mutually connected through an interconnecting network and are connected to a main memory, the method comprising:

storing a part of data in the main memory in one or more cache lines on cache memory and setting up a state tag to manage data consistency in each of the cache lines, and performing, as pre-fetch protocol, a weak read operation that fails a pre-fetch request following a read request from one of the processors, if at a time of generation of the pre-fetch request, the state tags of other cache devices must be changed to read the data stored in the other cache devices.

15. A method of controlling a cache system wherein cache devices set up in respective processors are mutually connected through an interconnecting network and are connected to a main memory, the method comprising:

storing a part of data in the main memory in one or more cache lines on cache memory and setting up a state tag to manage data consistency in each of the cache lines, in response to a pre-fetch request following a read request from one of the processor, reading data without changing state tags of other cache devices and storing the read data in the cache memory with setup of a weak state (W), at a time of generation of the pre-fetch request, the state tags of the other cache devices must changed to read the data stored in the other cache devices, and invalidating the data stored in the cache memory in the weak state (W) at a time of synchronization operation of memory consistency to attain data-consistency by software.

16. A method of controlling a cache system wherein cache devices set up in respective processors are mutually connected through an interconnecting network and are connected to a main memory, the method comprising:

storing a part of data in the main memory in one or more cache lines on cache memory and setting up a state tag to manage data consistency in each of the cache lines, setting as a state tag, at a time of generation of a pre-fetch request following a read request from one of the processors, a passive preservation mode P to data pre-fetched from other cache devices or the main memory and storing the pre-fetched data in said cache memory, not informing the other cache devices of the preservation of the data in said cache memory, when data for a read request from the other cache devices corresponds to the pre-fetch data to which said passive preservation mode P is set, and invalidating said pre-fetch data when, according to the read request from the other cache devices, none of the cache devices store the corresponding data, and storing said pre-fetch data as it is when, according to the read request from the other cache devices, the corresponding data is shared by the other cache devices.

* * * * *

UNITED STATES PATENT AND TRADEMARK OFFICE
CERTIFICATE OF CORRECTION

PATENT NO. : 6,918,009 B1　　　　　　　　　　　　　　　　　　　　　　Page 1 of 1
DATED : July 12, 2005
INVENTOR(S) : Mitsuru Sato et al.

It is certified that error appears in the above-identified patent and that said Letters Patent is hereby corrected as shown below:

Column 20,
Line 33, delete "W" and insert -- (W) --.

Column 22,
Line 8, after "(W)," and insert -- if --.

Signed and Sealed this

Second Day of May, 2006

JON W. DUDAS
*Director of the United States Patent and Trademark Office*